US006008738A

United States Patent [19]

Kudoh

[11] Patent Number: 6,008,738

[45] Date of Patent: *Dec. 28, 1999

[54] RADIO DISPLAY PAGER WITH REDUCED MANUALLY OPERATED KEYS

[75] Inventor: Kazuhiro Kudoh, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,142

[22] Filed: May 30, 1996

[30] Foreign Application Priority Data

May 30, 1995 [JP] Japan .................................... 7-132111

[51] Int. Cl.[6] ........................................ H04Q 7/00

[52] U.S. Cl. .................................... 340/825.44; 455/31.1; 455/217

[58] Field of Search ............................ 340/825.44, 311.1; 455/31.1, 38.2, 38.4, 70, 217; 379/56.1

[56] References Cited

U.S. PATENT DOCUMENTS 4,682,148 7/1987 Ichikawa et al. .................... 340/311.1
4,872,005 10/1989 DeLuca et al. .................... 340/825.44
5,332,994 7/1994 Kawashima et al. .............. 340/825.44
5,349,696 9/1994 Matai ........................................ 455/70
5,418,528 5/1995 Hosack et al. ..................... 340/825.44

FOREIGN PATENT DOCUMENTS 316750 2/1991 Japan .
325059 4/1991 Japan .
3289823 12/1991 Japan .
77759 1/1995 Japan .
779466 3/1995 Japan .

*Primary Examiner*—William A. Cuchlinski, Jr.
*Assistant Examiner*—Yonel Beaulieu
*Attorney, Agent, or Firm*—Sughrue, Mion, Zinn, Macpeak & Seas, PLLC

[57] ABSTRACT

In a radio display pager, a memory has message fields and corresponding attribute fields. When a message is received, it is stored in one of the message fields which are vacant. A message stored in one of the message fields is then displayed in response to the operation of a manual operated key. A protect indication is stored into the attribute field of the displayed message if the key is not subsequendy operated within a predetermined time interval. If the key is operated within that interval, a protect indication, if present in the attribute field of the displayed message, is deleted. If a new message is received when the message fields are already full, an unprotected old message is discarded to vacate a message field in which the new message is stored.

24 Claims, 3 Drawing Sheets

RADIO DISPLAY PAGER WITH REDUCED MANUALLY OPERATED KEYS

BACKGROUND OF THE INVENTION

1. Field of the Invention

The present invention relates generally to radio display pagers, and more specifically to a radio display pager where important messages are protected when a message memory is already filled to capacity upon arrival of a new message.

2. Description of the Related Art

Radio display pagers are usually provided with a memory for holding messages therein to allow the user to see them later when he becomes free to take necessary actions. Since the capacity of the memory is limited, the oldest message is discarded when the memory is already full upon arrival of a new message. However, the oldest message is not necessarily a less important message. Japanese Patent Hei-3-25059 discloses a radio display pager in which the user selects an important message and attaches a tag to it for indicating “protection” so that if the memory is already fill when a new message is received, an unprotected message is discarded and the oldest message, if protected, remains safely in the memory. However, the prior art pager employs four manually operated keys for functions such as alarm resetting, message scrolling, message deleting and message protection. Since the recent tendency is toward increasing the display area at the expense of the space for the keys, it is desirable to reduce the number of manually operated keys. In addition, it is desirable to simplify key operations using as less keys as possible.

U.S. Pat. No. 5,332,994, titled “Radio Pager with Power-Backup Memory for Storing Uncompleted Messages”, S. Kawashima et discloses a radio display pager wherein a label is attached to a message stored in a power-backup memory if the message is not answered by the user within a prescribed interval. When the pager is turned off for power savings purposes, the message is kept in the memory and when it is turned on again the memory is searched. If a label-attached message is detected, the user is alerted with a sound pattern that is different from the sound pattern initially used when the message is arrived. The difference in sound pattern allows the user to quicky recognize that there is a message that is not answered.

SUMMARY OF THE INVENTION

It is therefore an object of the present invention to provide a radio display pager having a reduced number of keys.

According to the present invention, a radio display pager comprises a receiver for detecting a message destined to the pager, a memory having a plurality of message fields and a plurality of corresponding attribute fields, and a manually operated key. A controller is provided for storing a message detected by the receiver into one of the message fields which are vacant, displaying a message stored in one of the message fields in response to a first operation of the key and storing a protect indication into the attribute field of the displayed message if the key is not subsequently operated within a predetermined time interval, deleting a protect indication if same is stored in the attribute field of the displayed message if the key is operated within the predetermined time interval, discarding an old message if the message fields are already filled to capacity when a new message is detected by the receiver to vacate a message field, provided that a protect indication is not stored in the attribute field of the old message, and storing the new message into the vacated message field.

BRIEF DESCRIPTION OF THE DRAWINGS

The present invention will be described in further detail with reference to the accompanying drawings, in which.

DETAILED DESCRIPTION

Figure 1:
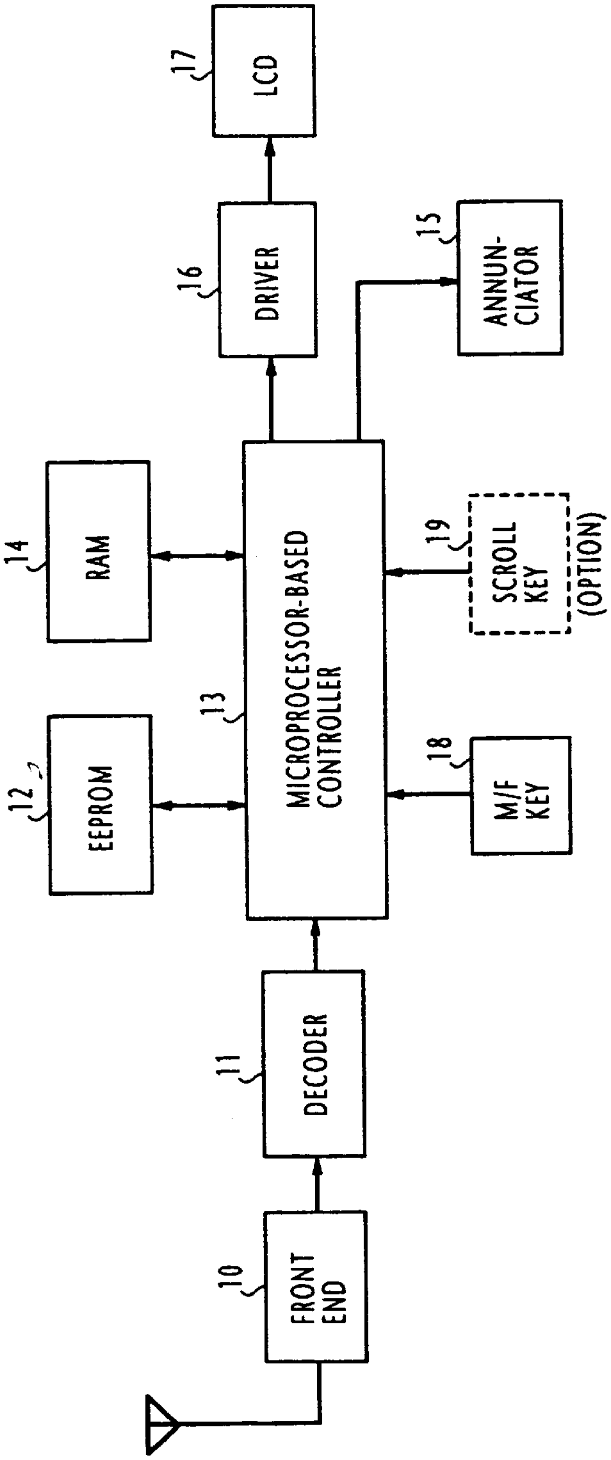
FIG. 1 is a block diagram of a radio display pager embodying the present invention.
Figure 2:
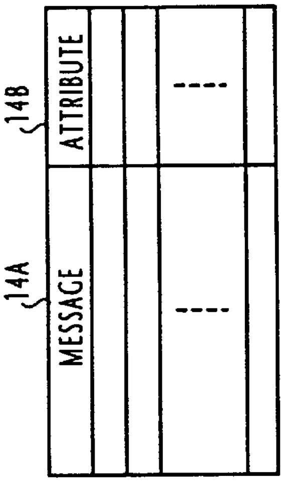
FIG. 2 is an illustration of a message memory.

Referring to FIG. 1, a radio display pager embodying the present invention is illustrated as comprising a radio frequency section, or front end 10 for receiving a broadcast radio paging signal and converting it to a baseband signal. The paging signal contains a preamble allowed by a sequence of frames each containing a calling address and a message. The received calling address is decided in a decoder 11 and compared in a microprocessor-based controller 13 with a user's address stored in an EEPROM (electrically erasable programmable read-only memory) 12. If they match, controller 13 directs the decoder to proceed with decoding the accompanying message. The decoded message is stored under the control of controller 13 into one of a plurality of entries defined in a message memory, or random-access memory 14. As shown in FIG. 2, each message entry of the memory 14 has a message field 14A for storing a message and a message attribute field 14B for storing a “protect” indication for signifying that the corresponding message is protected. An annunciator 15 is then activated to alert the user of the arrival of a message. A manually operated multi-function key 18, when operated, causes controller 13 to deactivate the annunciator 15 if it is activated and to read out a message, if there is one, from RAM 14 into a liquid crystal display 17 via a driver 16. A manually operated scroll key 19 is provided as an option.

Figure 3:
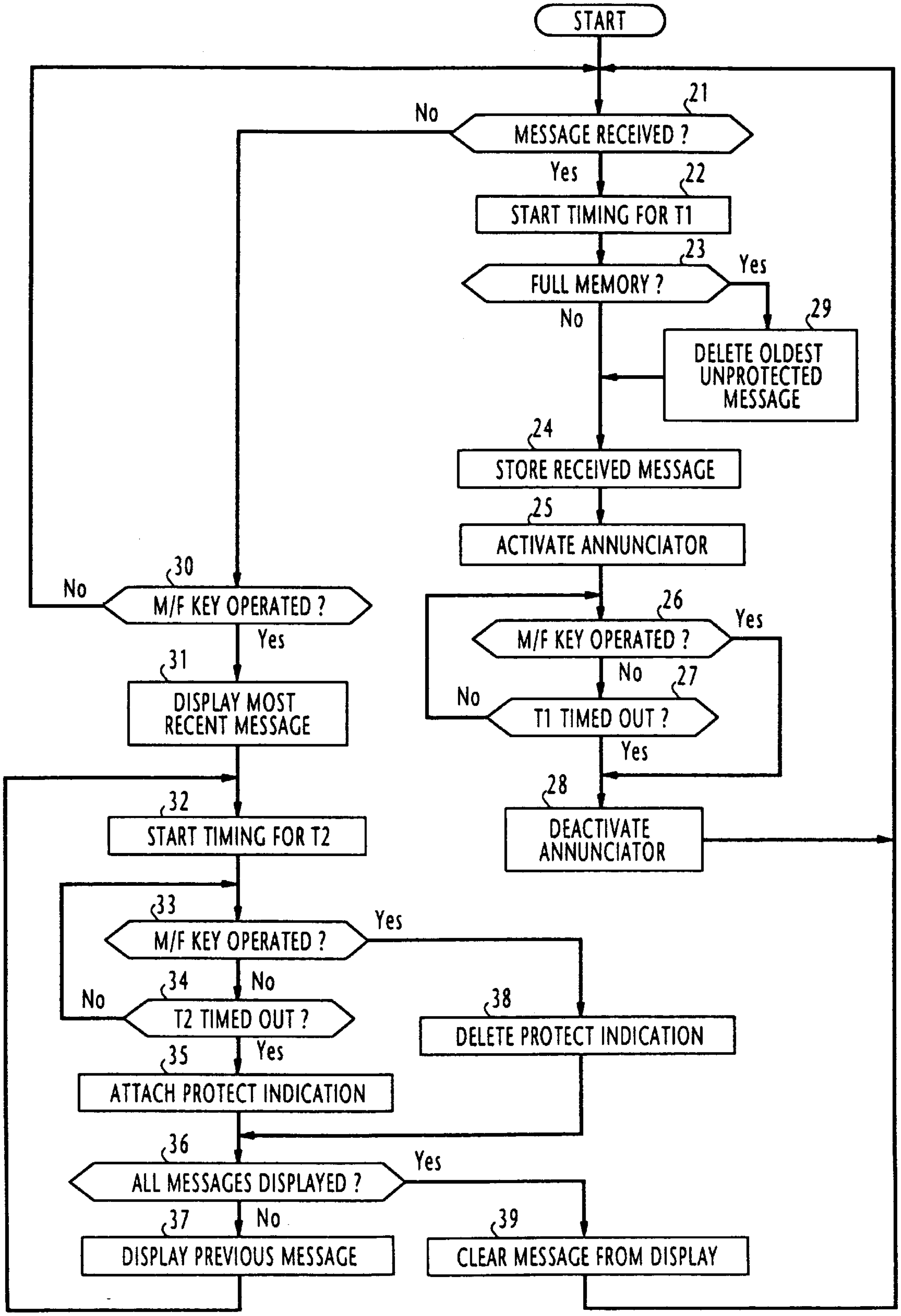
FIG. 3 is a flowchart of the operation of the microprocessor-based controller of FIG. 1 according to a first embodiment of the invention.

The operation of the controller 13 according to a first embodiment of the present invention is shown in the flowchart of FIG. 3 where only one manually operated key (i.e., multi-function key 18) is used.

During a standby state, steps 21 and 30 are repeatedly executed to check for the reception of a message and for the operation of the multi-function key 18. The operation of controller 13 starts with decision step 21 when a message destined to the pager is received during a standby state. Flow proceeds to step 22 where the controller 13 begins a timing operation for a time-out period T1. At step 23, controller 13 checks the message memory 14 to see if it is filled to capacity. If the memory is not full, flow proceeds from step 23 to step 24 where the controller stores the received message into the message field of a vacant entry of the message memory 14. Controller 13 then activates the annunciator 15 to alert the pager's user.

Flow proceeds to step 26 to determine whether or not the multi-function key 18 is operated. It the user operates the key 18, flow proceeds from step 26 to step 28 to deactivate the annunciator. If the alarm goes unnoticed, the time-out period T1 will expire (step 27) and the annunciator is deactivated at step 28. Following the execution of step 28, flow returns to the standby state to repeat steps 21 and 30. If subsequent messages are received, steps 21 to 28 will be repeated and a plurality of messages are stored in memory 14 in sequence according to their arrival times.

If the multi-function key 18 is operated when the pager is in the standby state, flow proceeds from step 30 to step 31 where the controller displays the most recent message on the LCD 17. At step 32, the controller begins a timing operation for a time-out period T2, and proceeds to step 33 to check to see if the multi-function key 18 is operated. If the user allows the timing operation to expire (step 34) no matter whether he has recognized the displayed message or not, flow proceeds to step 35 to attach a "protect" indication to the message being displayed by inserting a "1" bit into the corresponding attribute field. Exit then is to step 36 where the controller determines whether all messages stored in memory 14 have been displayed. If not, flow proceeds to step 37 to display a previous message in the memory and returns to step 32 to repeat the process. It will be seen therefore that if the user allows the timing operation started at step 32 to expire, the displayed previous message is also appended with a protect indication. If the execution of steps 32 to 37 are continued so that all the stored messages have been displayed (step 36), the protect indication is attached to all the stored messages and flow proceeds to step 39 to clear the last displayed message and returns to step 21. Such an automatic protect indication may occur when the user has no time to take an appropriate action to each message.

When the user has time to take actions to stored messages, he will operate the multi-function key 18 when the pager is in the standby state. This condition is detected at step 30 and the stored messages are sequentially displayed (steps 31 to 37), starting with the most recent one. If the user operates the key 18 after viewing each message within the time-out period T2, flow proceeds to step 38 to delete the protect indication of the message, and proceeds to step 36. If a stored message is not important, the user may operate the key 18 while it is being displayed.

With some of the stored messages being attached with protect indications and others unprotected, the arrival of a new message will cause the controller 13 to execute steps 22 and 23. If the memory 14 is filled to capacity, flow proceeds from step 23 to step 29 where the oldest unprotected message is deleted from the memory and other messages are shifted one entry position towards the entry position for older arrival to leave the entry position of the most recent arrival vacant to allow the new message to be stored therein at step 24.

Figure 4:
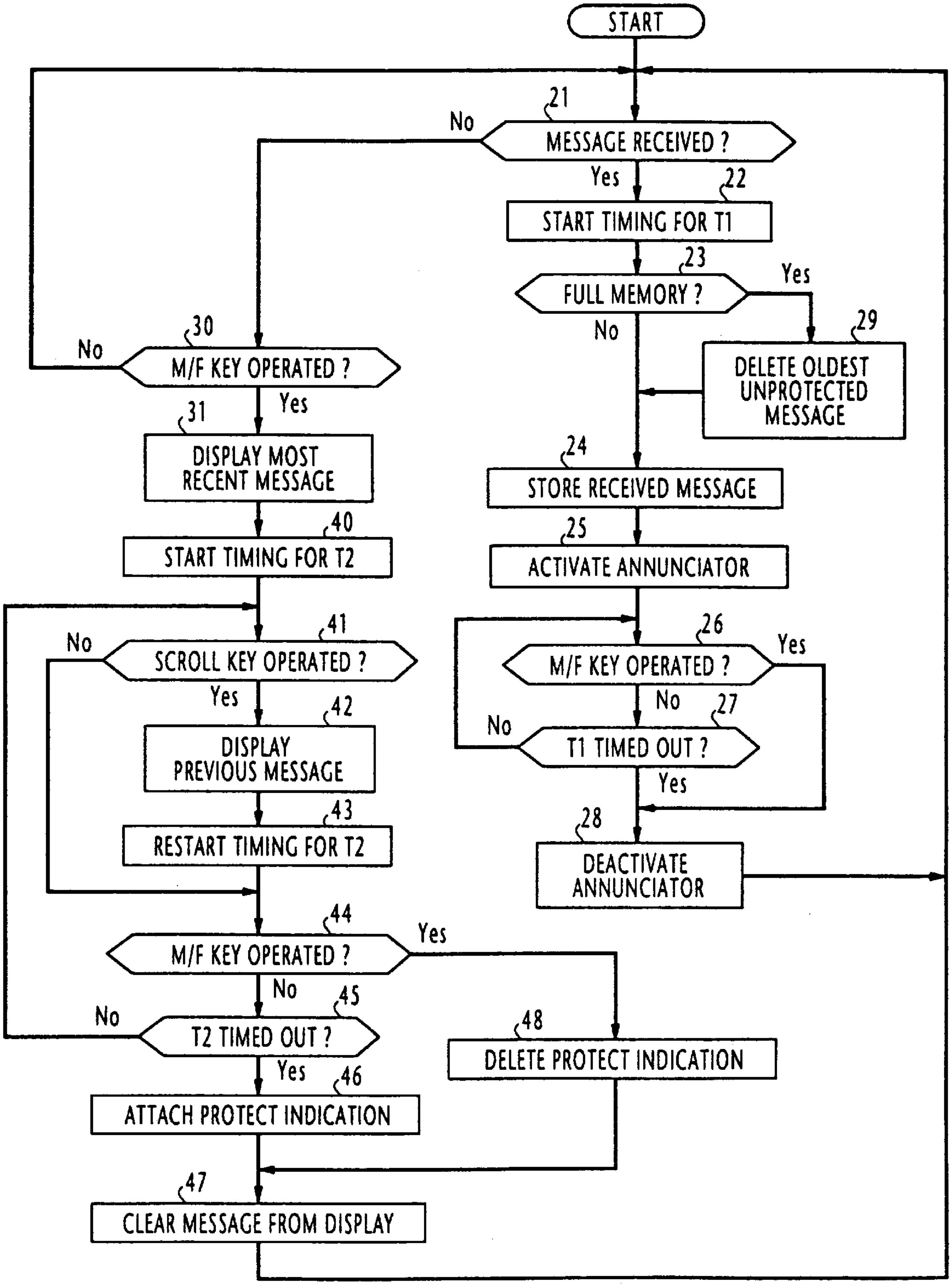
FIG. 4 is a flowchart of the operation of the microprocessor-based controller of FIG. 1 according to a second embodiment of the invention.

The operation of the controller 13 according to second embodiment of the present invention is shown in the flowchart of FIG. 4 wherein the optional scroll key 19 is used in addition to the multi-function key 18 and wherein steps corresponding to those in FIG. 3 are designated by the same numerals as used in FIG. 3 and the description thereof are omitted for simplicity.

During a standby state, the operation of the multi-function key causes the controller 13 to proceed from step 30 to step 31 to display the most recent message. Flow proceeds from step 31 to step 40 to begin a timing operation for T2. At step 41, the scroll key 19 is checked to see if it is operated. If the user sees the displayed most recent message and operates the scroll key 19 within the time-out period T2 in order to see the next message, flow proceeds from step 41 to step 42 to display the previous message. Following the display of the previous message, timing operation for T2 is restarted (step 43) and the multi-function key 18 is checked to see if it is operated (step 44). If the decision at step 41 is negative, flow proceeds to step 44, skipping steps 42 and 43, to determine whether or not the multi-function key 18 is operated, and then to step 45 to check for the expiration of die time-out period T2. If the decision at step 45 is negative, the controller returns to step 41.

If the scroll key 19 is operated while steps 41 to 45 are looped, a previous message is displayed. Therefore, all stored messages can be displayed in response to the operation of the scroll key 19 provided that the multi-function key 18 is not operated.

If the multi-function key 18 is not operated either within the time-out period initially set at step 40 or subsequently reset at step 43 while steps 41 to 45 are looped, flow exits from the loop and enters step 46 where the message currently displayed is given a protect indication. Exit then is to step 47 where the currently displayed message is cleared and flow returns to the starting point of the program. On the other hand, if the multi-function key 18 is operated while steps 41 to 45 are looped, flow exits from the loop and enters step 48 where the controller deletes the protect indication of the message being displayed, and flow proceeds to step 46.

What is claimed is:

1. A radio display pager comprising:

a receiver for detecting a message destined to the pager;

a memory having a plurality of message fields and a plurality of corresponding attribute fields;

a manually operated key; and a controller for storing a message detected by the receiver into one of the message fields which are vacant, displaying a message stored in one of the message fields in response to a first operation of the key and storing a protect indication into the attribute field of the displayed message if the key is not subsequently operated within a predetermined time interval, deleting the protect indication which is stored in the attribute field of the displayed message if the key is operated within said predetermined time interval, discarding an old message if the message fields are already filled to capacity when a new message is detected by the receiver to vacate a message field, provided that the protect indication is not stored in the attribute field of the old message, and storing the new message into the vacated message field.

2. A radio display pager as claimed in claim 1, wherein the deleted message is the oldest of the messages stored in the message fields whose corresponding attribute fields do not contain said protect indication.

3. A radio display pager comprising:

a receiver for detecting a message destined to the pager;

a memory having a plurality of message fields and a plurality of corresponding attribute fields;

a manually operated key; and a controller for storing a message detected by the receiver into one of the message fields which are vacant, successively displaying messages in sequence stored in the message fields in response to an operation of the key and storing a protect indication into the attribute field of a message being displayed if the key is not operated simultaneously with the display of the message, deleting the protect indication which is stored in the attribute field of a message being displayed if the key is operated simultaneously with the display of the message, discarding an old message if the message fields are already filled to capacity when a new message is detected by the receiver to vacate a message field, provided that the protect indication is not stored in the attribute field of the old message, and storing the new message into the vacated message field.

4. A radio display pager as claimed in claim 3, wherein the deleted message is the oldest of the messages stored in the message fields whose corresponding attribute fields do not contain said protect indication.

5. A radio display pager comprising:

a receiver or detecting a message destined to the pager;

a memory having a plurality of message fields and a plurality of corresponding attribute fields;

manually operated first and second keys; and a controller for storing a message detected by the receiver into one of the message fields which are vacant, displaying a message stored in one of the message fields in response to an operation of the first key and successively displaying a message stored in other message fields if the second key is operated simultaneously with the display of a message, and storing a protect indication into the attribute field of a message being displayed if the first key is not operated simultaneously with the display of the message, deleting the protect indication which is stored in the attribute field of a message being displayed if the first key is operated simultaneously with the display of the message, discarding an old message if the message fields are already filled to capacity when a new message is detected by the receiver to vacate a message field, provided that the protector indication is not stored in the attribure field of the old message, and storing the new message into the vacated message field.

6. A radio display pager as claimed in claim 5, wherein the deleted message is the oldest of the messages stored in the message fields whose corresponding attribute fields do not contain said protect indication.

7. A method for operating a radio display pager comprising a receiver for detecting a message destined to the pager, a memory for defining a plurality of message fields and a plurality of corresponding attribute fields, and a manually operated key, the method comprising the steps of:

a) storing a message detected by the receiver into one of the message fields which are vacant;

b) displaying a message stored in a first one of the message fields in response to an operation of the key;

c) storing a protect indication into the attribute field corresponding to said first one of the message fields if die key is not operated within a predetermined time interval following the step (b) and deleting the protect indication which is stored in the attribute field corresponding to said first one of the message fields if the key is operated within said predetermined time interval;

d) discarding a message stored in a second one of the message fields if the message fields are already filled to capacity when a new message is detected by the receiver to vacate a message field, provided that the protect indication is not stored in the attribute field corresponding to said second one of the message fields; and e) storing the new message into the vacated message field.

8. A method as claimed in claim 7, wherein the message deleted by the step (d) is the oldest of the messages stored in the message fields whose corresponding attribute fields do not contain said protect indication.

9. A method for operating a radio display pager comprising a receiver for detecting a message destined to the pager, a memory having a plurality of message fields and a plurality of corresponding attribute fields, and a manually operated key, the method comprising the steps of:

a) storing a message detected by the receiver into one of the message fields which are vacant;

b) displaying a message stored in a first one of the message fields in response to an operation of the key;

c) if the key is not operated within a predetermined time interval following the step (b), storing a protect indication into the attribute field corresponding to said first one of the message fields and displaying a message stored in a second one of the message fields;

d) if the key is operated within said predetermined time interval, deleting the protect indication which is stored in the attribute field corresponding to said first one of the message fields;

e) if the key is not operated within a predetermined time interval following the step (c), storing the protect indication into the attribute field corresponding to said second one of the message fields; and f) discarding a message stored in a third one of the message fields if the message fields are already filled to capacity when a new message is detected by the receiver to vacate a message field, provided that the protect indication is not stored in the attribute field corresponding to said third one of the message fields; and g) storing the new message into the vacated message field.

10. A method as claimed in claim 9, wherein the message deleted by the step (f) is the oldest of the messages stored in the message fields whose corresponding attribute fields do not contain said protect indication.

11. A method for operating a radio display pager comprising a receiver for detecting a message destined to the pager, a memory having a plurality of message fields and a plurality of corresponding attribute fields, and manually operated first and second keys, the method comprising the steps of:

a) storing a message detected by the receiver into one of the message fields which are vacant;

b) displaying a message stored in a first one of the message fields in response to an operation of the first key;

c) if the first key is not operated within a predetermined time interval following the step (b), storing a protect indication into the attribute field corresponding to said first one of the message fields;

d) if the second key is operated within said predetermined time interval following the step (b), displaying a message stored in a second one of the message fields;

e) if the first key is operated within said predetermined time interval following the step (b), deleting the protect indication which is stored in the attribute field corresponding to said first one of the message fields;

f) if the first key is not operated within a predetermined time internal following the step (d), storing the protect indication into the attribute field corresponding to said second one of the message fields; and g) discarding a message stored in a third one of the message fields if the message fields are already filled to capacity when a new message is detected by the receiver to vacate a message field, provided that the protect indication is not stored in the attribute field corresponding to said third one of the message fields; and h) storing the new message into the vacated message field.

12. A method as claimed in claim 11, wherein the message deleted by the step (g) is the oldest of the messages stored in the message fields whose corresponding attribute fields do not contain said protect indication.

13. An apparatus for receiving a message, comprising:

a memory having a plurality of message fields and a plurality of corresponding attribute fields;

a manually operated key; and a controller for storing a message detected by the receiver into one of the message fields which are vacant, displaying a message stored in one of the message fields in response to a first operation of the key and storing a protect indication into the attribute field of the displayed message if the key is not subsequently operated within a predetermined time interval, deleting the protect indication which is stored in the attribute field of the displayed message if the key is operated within said predetermined time interval, discarding an old message if the message fields are already filled to capacity when a new message is detected by the receiver to vacate a message field, provided that the protect indication is not stored in the attribute field of the old message, and storing the new message into the vacated message field.

14. The apparatus of claim 13, wherein the deleted message is the oldest of the messages stored in the message fields whose corresponding attribute fields do not contain said protect indication.

15. An apparatus for receiving a message, comprising:

a memory having a plurality of message fields and a plurality of corresponding attribute fields;

a manually operated key; and a controller for storing the received message into one of the message fields which are vacant, successively displaying messages in sequence stored in the message fields in response to an operation of the key and storing a protect indication into the attribute field of a message being displayed if the key is not operated simultaneously with the display of the message, deleting the protect indication which is stored in the attribute field of a message being displayed if the key is operated simultaneously with the display of the message, discarding an old message if the message fields are already filled to capacity when a new message is detected by the receiver to vacate a message field, provided that the protect indication is not stored in the attribute field of the old message, and storing the new message into the vacated message field.

16. The apparatus of claim 15, wherein the deleted message is the oldest of the messages stored in the message fields whose corresponding attribute fields do not contain said protect indication.

17. An apparatus for receiving a message, comprising:

a memory having a plurality of message fields and a plurality of corresponding attribute fields;

manually operated first and second keys; and a controller for storing a message detected by the receiver into one of the message fields which are vacant, displaying a message stored in one of the message fields in response to an operation of the first key and successively displaying a message stored in other message fields if the second key is operated simultaneously with the display of a message, and storing a protect indication into the attribute field of a message being displayed if the first key is not operated simultaneously with the display of the message, deleting the protect indication which is stored in the attribute field of a message being displayed if the first key is operated simultaneously with the display of the message, discarding an old message if the message fields are already filled to capacity when a new message is detected by the receiver to vacate a message field, provided that the protect indication is not stored in the attribute field of the old message, and storing the new message into the vacated message field.

18. The apparatus of claim 17, wherein the deleted message is the oldest of the messages stored in the message fields who corresponding attribute fields do not contain said protect indication.

19. A method for receiving a message using a memory and a manually operated key, wherein the memory defines a plurality of message fields and a plurality of corresponding attribute fields, the method comprising the steps of:

(a) storing a received message into one of the message fields which are vacant;

(b) displaying a message stored in a first one of the message fields in response to an operation of the key;

(c) storing the protect indication into the attribute field corresponding to said first one of the message fields if the key is not operated within a predetermined time interval following the step (b) and deleting the protect indication which is stored in the attribute field corresponding to said first one of the message fields if the key is operated within said predetermined time interval;

(d) discarding a message stored in a second one of the message fields if the message fields are already filled to capacity when a new message is detected by the receiver to vacate a message field, provided that the protect indication is not stored in the attribute field corresponding to said second one of the message fields; and (e) storing the new message into the vacated message field.

20. The method of claim 19, wherein the message deleted by the step (d) is the oldest of the messages stored in the message fields who corresponding attribute fields do not contain said protect indication.

21. A method for receiving a message using a memory and a manually operated key, wherein the memory defines a plurality of message fields and a plurality of corresponding attribute fields, the method comprising the steps of:

(a) storing a received message into one of the message fields which are vacant;

(b) displaying a message stored in a first one of the message fields in response to an operation of the key;

(c) if the key is not operated within a predetermined time interval following the step (b), storing the protect indication into the attribute field corresponding to said first one of the message fields and displaying a message stored in a second one of the message fields;

(d) if the key is operated within said predetermined time interval, deleting the protect indication which is stored in the attribute field corresponding to said first one of the message fields;

(e) if the key is not operated within a predetermined time interval following the step (c) storing the protect indication into the attribute field corresponding to said second one of the message fields;

(f) discarding a message stored in a third one of the message fields if the message fields are already filled to capacity when a new message is detected by the receiver to vacate a message field, provided that the protect indication is not stored in the attribute field corresponding to said third one of the message fields; and (g) storing the new message into the vacated message field.

22. The method of claim 21, wherein the message deleted by the step (f) is the oldest of the messages stored in the message fields whose corresponding attribute fields do not contain said protect indication.

23. A method for receiving a message using a memory and a manually operated key, wherein the memory defines a plurality of message fields and a plurality of corresponding attribute fields, the method comprising the steps of:

(a) storing a received message into one of the message fields which are vacant;

(b) displaying a message stored in a first one of the message fields in response to an operation of the first key;

(c) if the first key is not operated within a predetermined time interval following the step (b), storing the protect indication into the attribute field corresponding to said first one of the message fields;

(d) if the second key is operated within said predetermined time interval following the step (b), displaying a message stored in a second one of the message fields;

(e) if the first key is operated within said predetermined time interval following the step (b), deleting the protect indication which is stored in the attribute field corresponding to said first one of the message fields;

(f) if the first key is not operated within a predetermined time interval following the step (d), storing the protect indication into the attribute field corresponding to said second one of the message fields;

(g) discarding a message stored in a third one of the message fields if the message fields are already filled to capacity when a new message is detected by the receiver to vacate a message field, provided that the protect indication is not stored in the attribute field corresponding to said third one of the message fields; and (h) storing the new message into the vacated message field.

24. The method of claim 23, wherein the message deleted by the step (g) is the oldest of the messages stored in the message fields whose corresponding attribute fields do not contain said protect indication.

* * * * *

UNITED STATES PATENT AND TRADEMARK OFFICE

CERTIFICATE OF CORRECTION

PATENT NO. : 6,008,738
DATED : December 28, 1999
INVENTOR(S) : Kazuhiro Kudoh

It is certified that error appears in the above-identified patent and that said Letters Patent is hereby corrected as shown below:

Title page, Item [54] and Column 1, line 1,
Title, delete "RADIO" and insert therefor -- BASIC --.

Column 3,
Line 52, after "key" insert -- 18 --.

Signed and Sealed this

Eighth Day of April, 2003

JAMES E. ROGAN
*Director of the United States Patent and Trademark Office*